No. 728,764. PATENTED MAY 19, 1903.
G. ROBINSON.
WIRE TIGHTENER.
APPLICATION FILED JUNE 3, 1902.
NO MODEL.

Witnesses
Edwin L. McKee
B. L. Duck

Inventor
George Robinson
By Victor J. Evans
Attorney

No. 728,764. Patented May 19, 1903.

UNITED STATES PATENT OFFICE.

GEORGE ROBINSON, OF PERRYPARK, COLORADO.

WIRE-TIGHTENER.

SPECIFICATION forming part of Letters Patent No. 728,764, dated May 19, 1903.

Application filed June 3, 1902. Serial No. 110,091. (No model.)

*To all whom it may concern:*

Be it known that I, GEORGE ROBINSON, a citizen of the United States, residing at Perrypark, in the county of Douglas and State of Colorado, have invented new and useful Improvements in Wire-Tighteners, of which the following is a specification.

This invention relates to wire-tighteners, and has for its object to provide a device which may be conveniently operated by a single person, so as to stretch the line-wires of a fence and retain the same stretched, so that the staple may be driven into the post or the wire secured to the post in an effective manner to prevent its sagging.

The peculiar manner of accomplishing the desired result, as well as the novel details of construction, will be specifically described hereinafter and illustrated in the accompanying drawings, in which—

Figure 1:
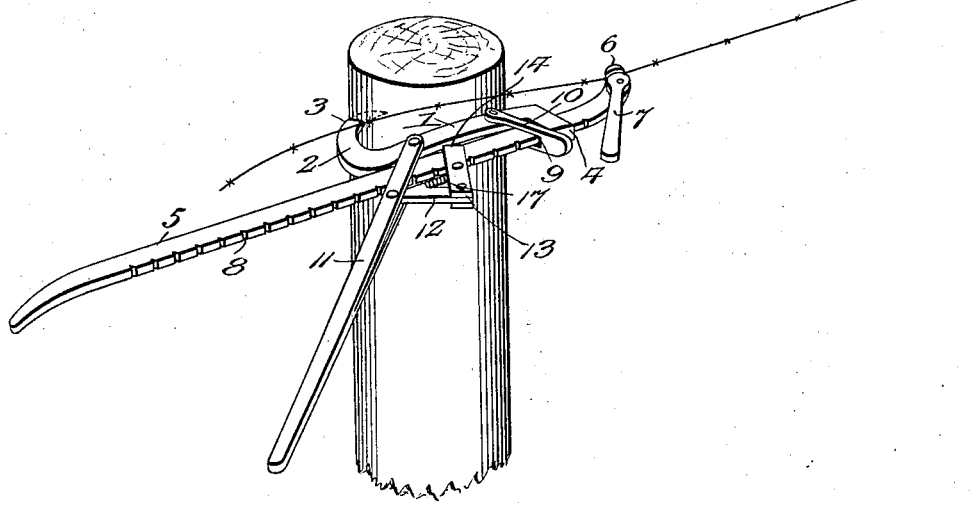
Figure 2:
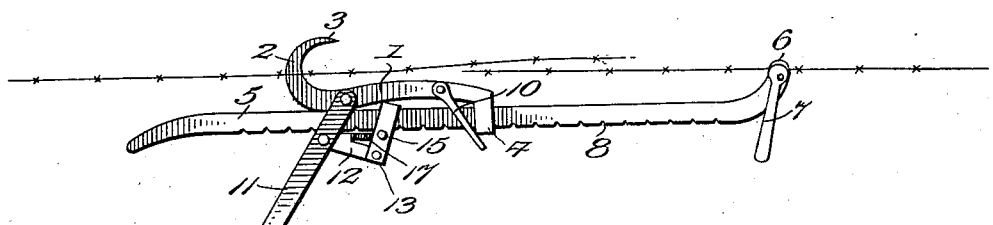
Figure 3:
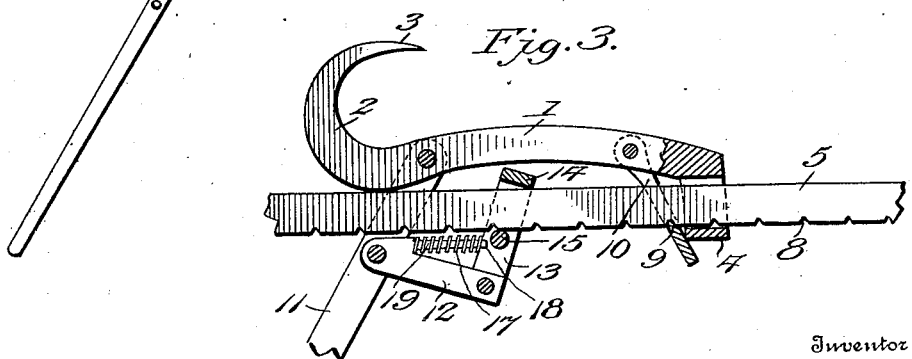

Figure 1 is a perspective view of a device constructed in accordance with my invention, showing the same applied. Fig. 2 is a top plan view of the same; and Fig. 3 is an enlarged sectional view of the jaw, showing the relative position of the parts thereof with relation to the guide-bar.

In carrying out the invention I provide a jaw 1, which comprises a bar curved at one end to form a hook 2, which is adapted to fit around and embrace the post. The end of the hook 2 is drawn to a sharp point 3, which may be inserted into the post to prevent its displacement. The opposite end of the bar 1 is provided with a right-angularly-arranged rectangular eye 4, through which a bar 5 passes and is loosely mounted therein. One end of the bar 5 is provided with an upturned lip 6, and adjacent to the lip is a pivoted cam-lever 7, which is adapted to bind against the lip 6, so as to clamp the wire against the same. One side of the bar 5 is provided with a plurality of edge notches or graduations 8, which are designed to be engaged by the sharpened transverse bar 9 of the U-shaped link 10, which is pivoted to the respective sides of the bar 1. This link straddles the bar 5 and engages the notches, so as to hold the bar in locked engagement with the bar 1. Pivoted to the bar 1 and at a point adjacent the hook and distant from the eye 4 is an actuating-lever 11, which straddles the bar 5 and has pivotally secured to it a link-bar 12, secured immediately below the bar 5 and connected to an inverted-U-shaped loop 13, which straddles the bar 5 and has its upper edge 14 resting on the top of the bar 5, so as to engage it by frictional contact. The bar 5 is supported in a measure upon a transverse pin 15, which is secured to the parallel arms of the loop 13.

On one side of the link 12 is a shoulder 19, from which projects a pin 16, the free end 18 of which terminates at a point adjacent to the pin 15. Upon the pin 16 are arranged the convolutes of a coil-spring 17, one end of which rests against the shoulder 19 and the other of which is arranged to abut against the loop 13, so as to move the same out of engagement with the bar when it is desired to move the loops on the bar.

In operation the hooked portion of the bar 1 will be caused to engage the post or other suitable support, and the bar 5 will be run through the eye or loop 4 by disengaging the link 9 and the loop 13 therefrom, so that a considerable portion of the bar 5 will extend out beyond the eye 4. The wire will be clamped between the lip 6 and the lever 7, and by operating the lever 11 from left to right the loop 13 will be forced over toward the eye 4 and will be caused to engage the lever 5 by frictional contact. By retracting the lever from right to left the bar will be drawn through the eye 4, and at the end of the stroke of the lever 11 the link 9 will engage in one of the edge notches 8 and the bar 5 and hold it in locked position until the loop 13 can again get the purchase on the rod 5, which can be accomplished by working the lever 11 again toward the right. This operation will be successively continued until the wire is stretched sufficiently, when the same will be fastened to the post by staple, nail, or other fastening device.

Having thus described my invention, what I claim, and desire to secure by Letters Patent, is—

The combination with a notched bar having wire-clamping means at one end; of a second bar, an integral projection at one end having a guide-opening for the notched bar, a hooked projection at the other end for engagement with a post, a loop pivoted to said second bar and straddling the notched bar, said loop having a sharpened edge for engaging the notches, a lever pivoted to said second bar and straddling the notched bar, a loop straddling the notched bar and adapted to engage the same by frictional contact, a pin in said loop for limiting its movement upon said bar, a link connecting said loop and lever, a shoulder thereon, a pin rigid to the shoulder and projecting into the loop, and a spring upon the pin and bearing at opposite ends upon the shoulder and loop, respectively.

In testimony whereof I affix my signature in presence of two witnesses.

GEORGE ROBINSON.

Witnesses:
ROBERT E. PALM,
W. D. EDMONSTON.